US009391727B2

(12) United States Patent
Osborn et al.

(10) Patent No.: US 9,391,727 B2
(45) Date of Patent: Jul. 12, 2016

(54) METHOD AND SYSTEM FOR SUB-AUDIBLE SIGNALING

(71) Applicant: Clip Interactive, LLC, Boulder, CO (US)

(72) Inventors: Jeff Osborn, Broomfield, CO (US); Ben Good, Dacono, CO (US); Mike Perkins, Louisville, CO (US); Glen Diener, Louisville, CO (US)

(73) Assignee: Clip Interactive, LLC, Boulder, CO (US)

(*) Notice: Subject to any disclaimer, the term of this patent is extended or adjusted under 35 U.S.C. 154(b) by 0 days.

(21) Appl. No.: 14/336,948

(22) Filed: Jul. 21, 2014

(65) Prior Publication Data

US 2015/0023402 A1 Jan. 22, 2015

Related U.S. Application Data

(60) Provisional application No. 61/856,508, filed on Jul. 19, 2013.

(51) Int. Cl.

| | |
|---|---|
| ***H04B 1/66*** | (2006.01) |
| ***H04H 60/07*** | (2008.01) |
| ***H04H 20/31*** | (2008.01) |
| *H04H 20/42* | (2008.01) |

(52) U.S. Cl.

CPC ............... *H04H 60/07* (2013.01); *H04H 20/31* (2013.01); *H04H 20/423* (2013.01)

(58) Field of Classification Search

CPC ..... H04H 60/07; H04H 20/31; H04H 20/423; H04L 25/08; H04L 25/497

USPC ......... 375/240, 229, 230, 232, 260, 262, 265, 375/267; 370/203, 204, 208, 209, 210

See application file for complete search history.

(56) References Cited

U.S. PATENT DOCUMENTS

| | | | | |
|---|---|---|---|---|
| 5,809,085 | A | 9/1998 | Goodson et al. | |
| 2005/0053020 | A1 | 3/2005 | Thirumoorthy | |
| 2005/0219068 | A1* | 10/2005 | Jones et al. | 341/50 |
| 2006/0155399 | A1 | 7/2006 | Ward | |
| 2008/0294548 | A1 | 11/2008 | Fowler et al. | |
| 2010/1342789 | | 6/2010 | Srinivasan et al. | |
| 2011/0125508 | A1* | 5/2011 | Kelly et al. | 704/502 |

(Continued)

OTHER PUBLICATIONS

International Search Report and Written Opinion for International Application No. PCT/US2014/047475 mailed Nov. 25, 2014.

(Continued)

*Primary Examiner* — Dhaval Patel

(74) *Attorney, Agent, or Firm* — Cooley LLP

(57) ABSTRACT

Disclosed are various embodiments for a system and method for encoding sub-audible codes within a signal. One exemplary embodiment includes a method that includes receiving a first digital code and a second digital code; receiving a first block and a second block of a signal; embedding an echo of the first block of the signal in the second block of the signal to create a first modified second block of the signal in accordance with the first digital code; modulating the power of the first modified second block of the signal to create a second modified second block of the signal in accordance with the second digital code; and sending a modified signal including the second modified second block of the signal.

17 Claims, 13 Drawing Sheets

(56) References Cited

U.S. PATENT DOCUMENTS

| | | | |
|---|---|---|---|
| 2011/0138020 | A1 | 6/2011 | Pantos et al. |
| 2011/0173208 | A1 | 7/2011 | Vogel |
| 2012/0010996 | A1 | 1/2012 | Horvitz et al. |
| 2012/0036034 | A1 | 2/2012 | Golden et al. |
| 2012/0245995 | A1 | 9/2012 | Chawla |
| 2013/0151241 | A1 | 6/2013 | Park et al. |

OTHER PUBLICATIONS

U.S. Office Action mailed Oct. 23, 2014 for U.S. Appl. No. 13/660,733.

U.S. Office Action mailed Jul. 23, 2015 for U.S. Appl. No. 13/660,733.

* cited by examiner

METHOD AND SYSTEM FOR SUB-AUDIBLE SIGNALING

CLAIM TO PRIORITY AND CROSS REFERENCES TO RELATED APPLICATIONS

The present application claims priority to commonly owned and assigned U.S. Provisional Application Ser. No. 61/856,508, filed Jul. 19, 2013, entitled Embedding Sub-audio Signaling and is related to commonly owned and assigned U.S. application Ser. No. 13/660,733, filed Oct. 25, 2012, entitled Apparatus, System, and method for Digital Audio Services (the "'733 application"), the disclosure of each of which is incorporated herein by reference in its entirety for all purposes.

FIELD

The present invention relates to methods and systems for encoding and decoding steganographic information in analog signals. In particular, but not by way of limitation, the present invention relates to encoding analog audio with content and source information for use by consumer devices to interact with broadcasters and third parties sources of content.

BACKGROUND

Broadcast signals can often include information about the source or the content of the signal. For example, radio stations broadcast RDS data. But RDS data and other broadcast signaling requires additional frequency resources. Moreover, such signaling requires the use of expensive radio receivers, such as a high-definition radio to process such signaling. Additionally, RDS and other current signaling technologies are limited in the amount of data that can be carried. For other types of signaling, aesthetics are a concern when modulating a signal and those other types of signaling are limited by those considerations.

SUMMARY

Exemplary embodiments are shown in the drawings and are summarized below. These and other embodiments are more fully described in the Detailed Description section. It is to be understood, however, that there is no intention to be limited to the forms described in this Summary or in the Detailed Description. One skilled in the art can recognize that there are numerous modifications, equivalents, and alternative constructions that fall within the spirit and scope of the inventions as expressed in the claims.

Embodiments can provide a system and method for encoding sub-audible codes within a signal. One exemplary embodiment includes a method that includes receiving a first digital code and a second digital code; receiving a first block and a second block of a signal; embedding an echo of the first block of the signal in the second block of the signal to create a first modified second block of the signal in accordance with the first digital code; modulating the power of the first modified second block of the signal to create a second modified second block of the signal in accordance with the second digital code; and sending a modified signal including the second modified second block of the signal.

Another exemplary embodiment includes a computer-readable storage medium containing a plurality of program instructions executable by a processor, comprising an instruction segment for receiving a first digital code and a second digital code; an instruction segment for receiving a first block and a second block of an signal; an instruction segment for embedding in a second block of a received signal having a first block and second block an echo of the first block of the signal in the second block of the signal to create a first modified second block of the signal in accordance with a the received first digital code; an instruction segment for modulating the power of the first modified second block of the signal to create a second modified second block of the signal in accordance with a received the second digital code; and an instruction segment for sending a modified signal including the second modified second block of the signal.

Embodiments disclosed herein can work with digital or analog signals and can be used to transmit a number of codes within the same signal. The number of codes can be used to identify the source of the content of the signal or the content itself. Disclosed embodiments are particularly useful for embedding multiple codes in a single signal using both echo modulation and power modulation in ways that minimize the effect of noise or distortion on the encoding. Disclosed embodiments allow the transfer of power modulation metadata within echo modulation. In other words, echo modulation can carry coded information about the source of the signal, information about the content of the signal, etc. and also carry information required to decode information embedded by way of power modulation. Thus, disclosed embodiments provide systems and methods for generating interdependent encoding schemes using different modulation techniques within the same signal. In this way, disclosed embodiments enable efficient embedding of multiple codes in the same signal while maintaining fidelity in the signal. That is, disclosed embodiments can embed codes while maintaining fidelity of the signal which can depend on the application (i.e., music, spoken word audio, video, digital, analog, etc.)

Disclosed embodiments further enable encoding a signal for broadcast without the coordination of the broadcaster or other parties and encoding a signal by multiple parties with minimal or no coordination. For example, a broadcaster or other party can add power modulation encoding to a signal that has already been encoded as described above and require only power modulation metadata (e.g., the encoding block boundary parameters for the existing encoding) and still generate a multiple-encoded signal. Further, another party can add power modulation encoding to a signal that has already been encoded as described above and require no power modulation metadata first. That is, power modulation metadata can be obtained by decoding echo modulation in the signal. Accordingly, signals can be encoded in different steps at different times, decoded partially to obtain only some of the encoded information without obtaining all it, or decoded without a prior knowledge about the specific parameters used by all of the encoding techniques.

BRIEF DESCRIPTION OF THE DRAWINGS

Various objects and advantages and a more complete understanding of the disclosed embodiments are apparent and more readily appreciated by reference to the following Detailed Description and to the appended claims when taken in conjunction with the accompanying Drawings wherein:

DETAILED DESCRIPTION

Figure 1:
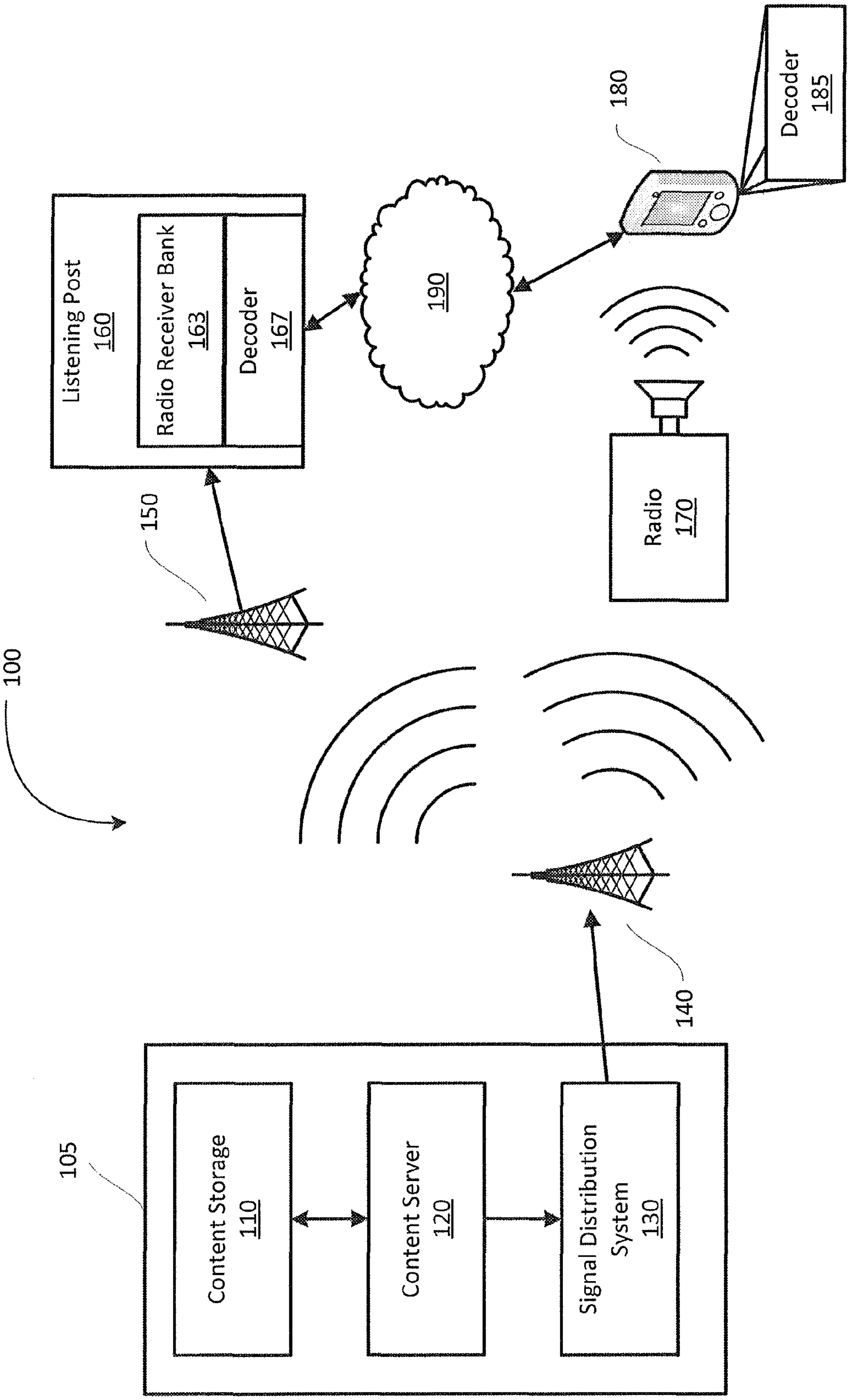
FIG. 1 illustrates a block schematic of a system that allows for encoding of analog signals and the reception and decoding of analog signals for interaction with consumer devices.

FIG. 1 illustrates an embodiment of a system 100 for encoding and decoding broadcast analog signals for interactive use. The system 100 includes components of a broadcast facility 105 on the left side. The broadcast facility 105 can be a radio station, television station, or other facility that packages content for broadcasting. The broadcast facility 105 includes content storage 110, a content server 120, and a signal distribution system 130. The content storage 110 stores content to be encoded and can store content in either digital or analog format. Content can include ads, music, newscasts, or other types of media to be broadcast. Although embodiments disclosed herein are described in reference to audio content, embodiments can be adapted to work with other types of media such as video. Content can be stored in content storage 110 in either digital or analog format on a disk array, solid state storage device, tape, or some other storage device appropriate to the format of the content. The content server 120 retrieves the content to be broadcast and forwards it through the radio station's signal distribution system 130. Typically, the content server 120 will retrieve the content when it is broadcast. The signal distribution system 130 delivers the content signal to an antenna 140 for broadcast transmission.

In some instances, the broadcast signal from antenna 140 can be analog, such as traditional radio or television broadcast. In some instances, the broadcast signal from antenna 140 can be digital (e.g., iBiquity's HD Radio). Some embodiments can receive other types of signals for decoding, such as content streamed over the internet.

In the embodiment shown, a listening post antenna 150 and a radio 170 receive the broadcast. The listening post 160 receives the broadcast signal from antenna 150 and can include a radio receiver bank 163, with one or more radio receivers each tuned to a frequency to receive a particular broadcast. A device 180 receives the analog sound from radio 170. Device 180 can be a smartphone or other handheld device with a microphone or other audio input component. Device 180 can also be some other type of computing device such as a tablet, laptop, desktop, or some other type of computer capable of receiving media input. Device 180 can also be a remote control device or other special-purpose monitoring device. In some embodiments, some other type of input can be used. For example, where an embodiment is applied to video, device 180 can be or include an image recording device or component for receiving input. In the embodiment shown, the listening post 160 and device 180 decode the broadcast signal. In particular, the listening post 160 includes a specially programmed decoder 167 to decode the broadcast signal and the device 180 is specially-programmed with a decoder 185 for the broadcast signal, described further below. Decoder 185 can be an application module or firmware on device 180. In some embodiments, device 180 can be a hardware device specifically designed as a decoder.

It should be understood, that listening post 160, radio receiver bank 163, decoder 167, radio 170, device 180, and decoder 185 can be combined into fewer devices or further separated. For example, embodiments can include a receiver and specially programmed computer in a single device to receive and decode the broadcast signal. Other embodiments can include a single receiver to receive the broadcast signal and two or more specially programmed computing devices to decode the broadcast signal. Each computing device can decode one or more portions of the broadcast signal.

For embodiments including a listening post separate from device 180 or other end-user devices, listening post 160 can be connected to a network 190 to communicate with device 180 or other end-user device to communicate decoded information from the broadcast signal.

Still referring to FIG. 1, content clips (i.e., segments of content including ads, individual songs, individual programs, newscasts, other types of content, or defined portions of content) can be pre-processed to include encoding of multiple codes while the content is stored at content storage 110 and before retrieval by content server 120. For example, content stored in content storage 110 can be encoded with a Source ID (SID) and a Content ID (CID). The CID will normally be relatively large in relation to the SID, for example, 20 bits, while the SID only needs to be 5 or 6 bits in size. Some embodiments will encode the signal so that the CID and SID are continually repeated throughout the duration of a clip so that they can be decoded regardless of where a decoding device begins processing a clip.

In the embodiment shown, listening post 160 decodes the CID and device 180 decodes the SID. In this way, a playlist of content can be compiled at listening post 160 for storage and later retrieval. When consumers respond to a content's message via an application on device 180 or other consumer device, information about the content can be retrieved using information about the source of the content consumed at the consumer device and the playlist from the same source compiled from decoding the broadcast or other signal. In other embodiments, listening post 160, device 180, or some other discrete computing device or set of computing devices can decode multiple portions of the signal. Such embodiments can be used such that content interaction can be performed without requiring a playlist to be compiled or with the use of a pre-compiled playlist (e.g., a playlist created from a programming list rather than from decoding a signal). Device 180 can use decoded content information to interact with the producer of the content (e.g., advertiser, radio station, artist or artist label, and the like) as described in the '733 application.

Embodiments can be used to enable interaction with content in numerous ways. In some instances, device 180 can record an audio segment, generate a timestamp, decode a SID, and forward the SID and timestamp to a server that has access to a playlist. The server can determine the content played by the source, as indicated by the SID received from and decoded by device 180, by referencing the playlist for the source. The playlist will include information about and/or related to the content because it had been compiled, at least partially, from CIDs from the same signal that included the SID. The server can act depending on the CID or the information related to the content, such as returning an ad, a web link, etc. to device 180.

In the embodiment shown, the signal available to the device 180 is obtained by recording the output of a speaker of the radio 170 with a microphone of the device 180. The conversion from electronic form to audio sound waves via a speaker introduces significant noise and distortion to the signal. Thus, when the signal is converted back to an electrical signal via a microphone, for example in device 180, the signal will include that significant noise and distortion. The signal acquires ambient noise from the environment of the speaker/microphone. The significance of the ambient noise varies along with the quality of speakers and microphones. Listening post 160, on the other hand, has direct access to the signal before a speaker outputs the signal. Listening post 160, therefore, is not subject to the same level of noise and distortion experienced by device 180. Accordingly, listening post 160 receives a higher bitrate than device 180 receives. Listening post 160, therefore, can decode a higher bitrate code than device 180. In some instances, a code identifying or describing content will be encoded at a higher bitrate than a code identifying the station or source of the content. Thus, in the embodiment shown, listening post 160 decodes the CID and device 180 decodes the SID. In other instances, listening post 106 and device 180 can be used to decode other signals that include multiple other types of codes with disparate bitrates. Those of skill in the art can appreciate that signals can be encoded with other codes than just CIDs and SIDs.

Listening post 160 can extract a code from the signal and can forward it to a server. In some instances, the server can be in the cloud (i.e., on another network or elsewhere on the internet 190) or on the same internal network as listening post 160. The cloud server uses the CIDs to compile a station's playlist in real-time. Device 180 can interact with the server to determine the content that was played at a particular point in time. For example, device 180 can retrieve information from a playlist compiled from decoding signals at listening post 160.

In some instances, signal distribution system 130, including a module or device in signal distribution system 130, can encode the signal with a CID, SID, or other multiple codes. Signal distribution system 130 can encode the signal in real-time, that is, as the content is broadcast. During the broadcast process, content (i.e., ads, music, newscasts, video, etc.) is received from content storage 110 and broadcast by signal distribution system 130. The content can be fully encoded, partially encoded, or unencoded when it is received from content storage 110. A signal need not be pre-encoded (i.e., encoded before it is stored or before the broadcasting process). In other instances, content server 120 can encode the signal before it is stored or before the broadcasting process.

It should be understood that content storage 110, content server 120, and signal distribution system can be further separated or combined. Content server 120 and signal distribution system 130 can be contained in the same or different modules within the same computer server, in modules in different computer servers, or as different computer servers. In some instances, a broadcaster hosts content storage 110, content server 120, and signal distribution system 130. In other instances, a third party can host content storage 110, content server 120, and signal distribution system 130. In yet other instances, a broadcaster or third party can each host portions of content storage, content server, and signal distribution system.

Figure 2:
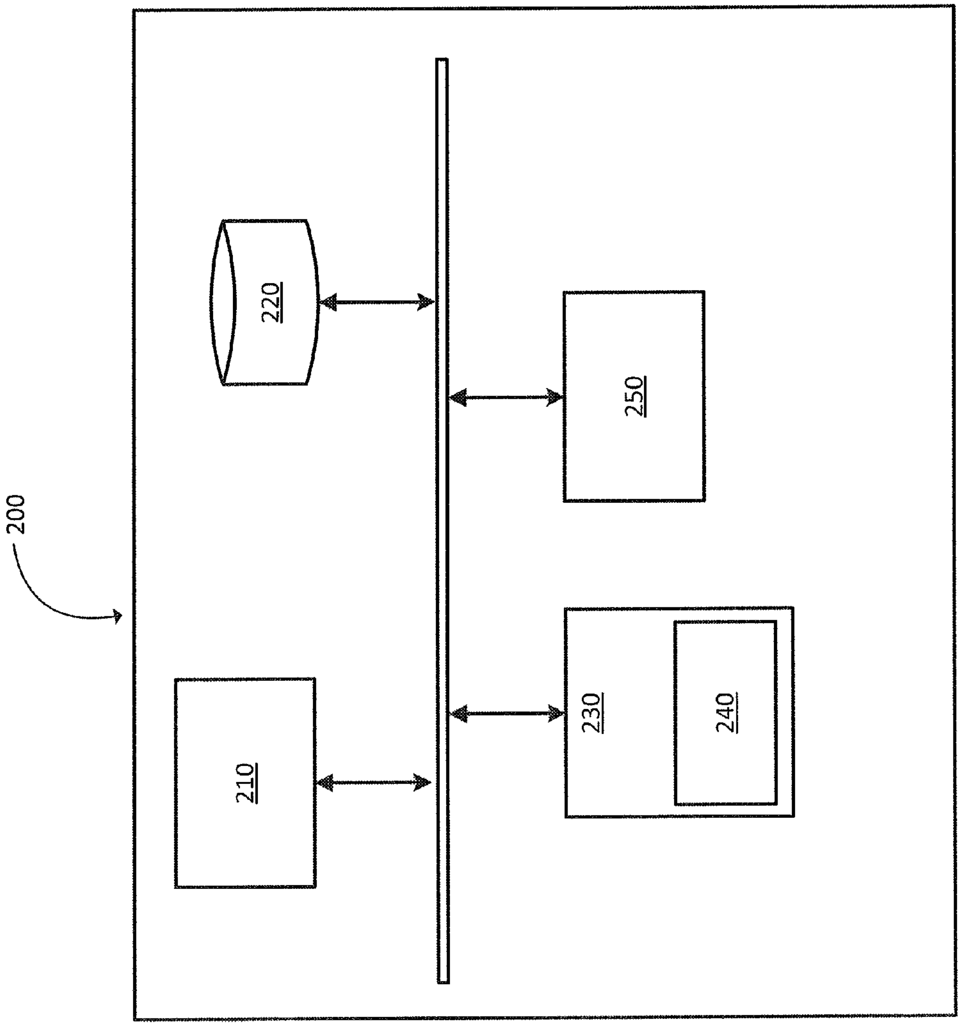
FIG. 2 illustrates a schematic block diagram of a specially-programmed computer that can implement one or more of the computer system components in accordance with embodiments.

FIG. 2 illustrates an embodiment of specially-programmed computer 200 that can implement one or more of the foregoing components in accordance with some embodiments. Such a computer 200 can include a network communications interface 210, storage medium 220, memory 230, program instructions 240, and processor 250. Program instructions 240 can be used to implement one or more of the components or portions of components of the system 200. Moreover, in some embodiments, additional hardware components of computer 200 can be included that implement one or more of the components or portions of components of the system 200. The storage medium 220 can be a hard disk drive, but this is certainly not required, and one of ordinary skill in the art will recognize that other storage media may be utilized with disclosed embodiments. In addition, one of ordinary skill in the art will recognize that the storage medium 220, which is depicted for convenience as a single storage device, may be realized by multiple (e.g., distributed) storage devices.

Figure 3:
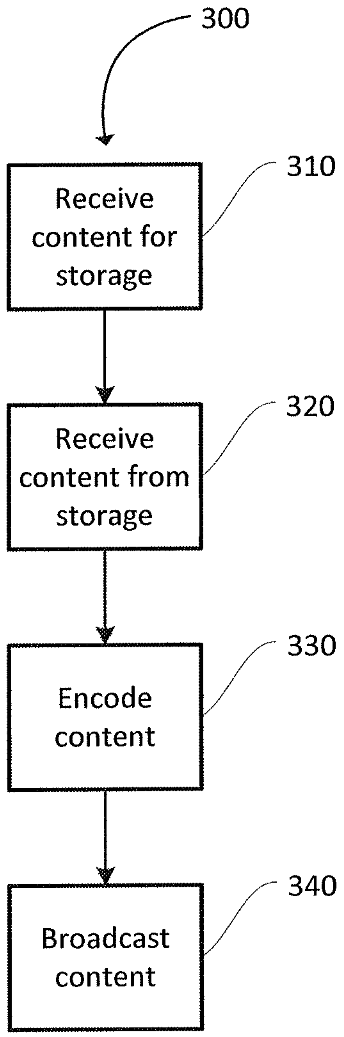
FIGS. 3-6 illustrate flowcharts for methods of encoding a signal in accordance with embodiments.

FIG. 3 illustrates a method 300 for encoding a signal to be broadcast. At step 310, content is received for storage. Content can be created by and received from a third party content producer or can be created by the broadcaster and received by content storage 110 or other server for storage in content storage 110. At step 320, content is received from content storage 110. Here, the content is received in preparation for broadcast and has not been encoded. In some instances, the content may have been encoded with other information not relevant to embodiments disclosed herein. For example, content can be encoded with an identifying code from an artist's producer or label for copyright protection purposes. At step 330, the content is encoded. In some instances, the content is encoded with a CID and an SID. In some instances, additional encoding can be performed. At step 340, the content is broadcast. For example, signal distribution system 130 can receive and distribute the content.

Figure 4:
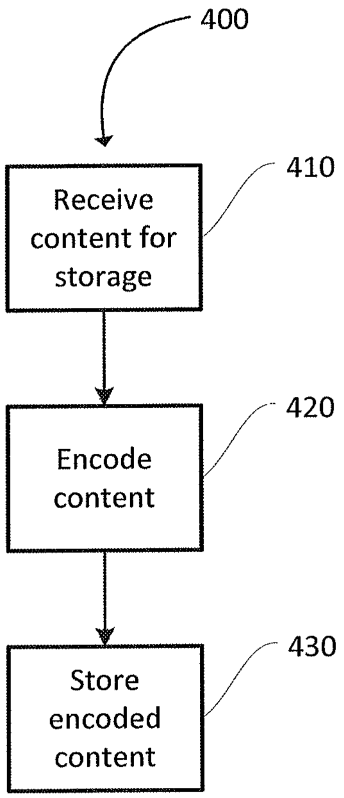

FIG. 4 illustrates method 400 representing an alternative embodiment. At step 410, content is received for storage. Again, the content is received in preparation for broadcast and has not been encoded. In some instances, the content is received shortly before it is to be broadcast. In some instances, the content is received for longer term storage. For example, the content is received to be played numerous times. At step 420, the content is encoded. At step 430, the encoded content is stored. Generally, the encoded content will be retrieved later for broadcast.

Figure 5:
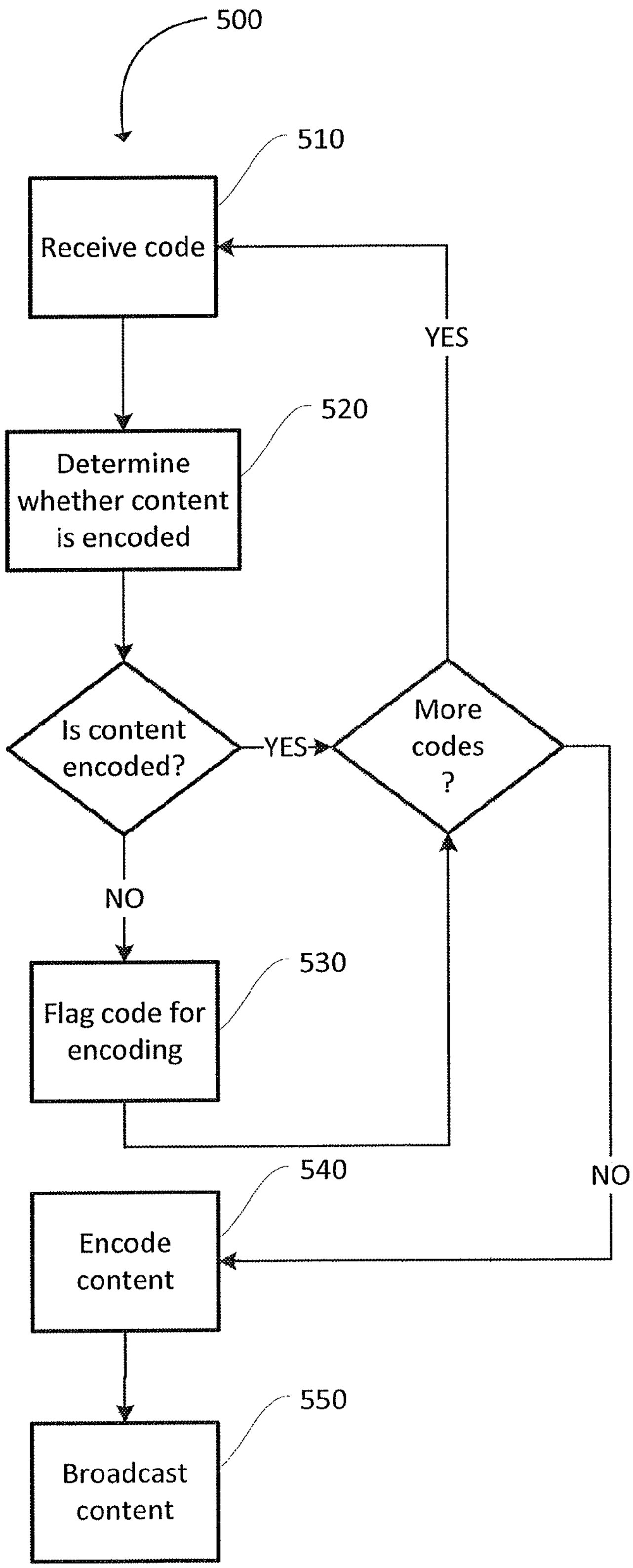

Referring now to FIG. 5, a method 500 for encoding content is illustrated. At step 510, a code is received. A code can be information about the content, the source of the content, an offer associated with the content, or some other information useful for identification or matching purposes or for user interaction purposes. Those skilled in the art can appreciate that virtually any message can be embedded in a code. A code can be received from content storage 110 or from some other source.

At step 520, it is determined whether the content is encoded with the code. In some instances, the content can be decoded and, if a code is extracted from the content, the extracted code can be compared to the code. In such instances, the encoding can require that codes are checked in a particular sequence. For example, encoding using power modulation may have to be decoded before encoding using echoing. In some instances, information about the content can be referenced to determine whether it is encoded. For example, a file can include information about the content, including whether the content is encoded and the type of encoding in accordance with the encoding types disclosed herein. If there is a match, then the process of determining whether the content is encoded is performed again for another code. If there is not a match, then the code is flagged for encoding at step 530. After all codes are checked, the content is encoded with the codes at step 540. Here, only the codes flagged for encoding are encoded. At step 550, the content is broadcast.

Figure 6:
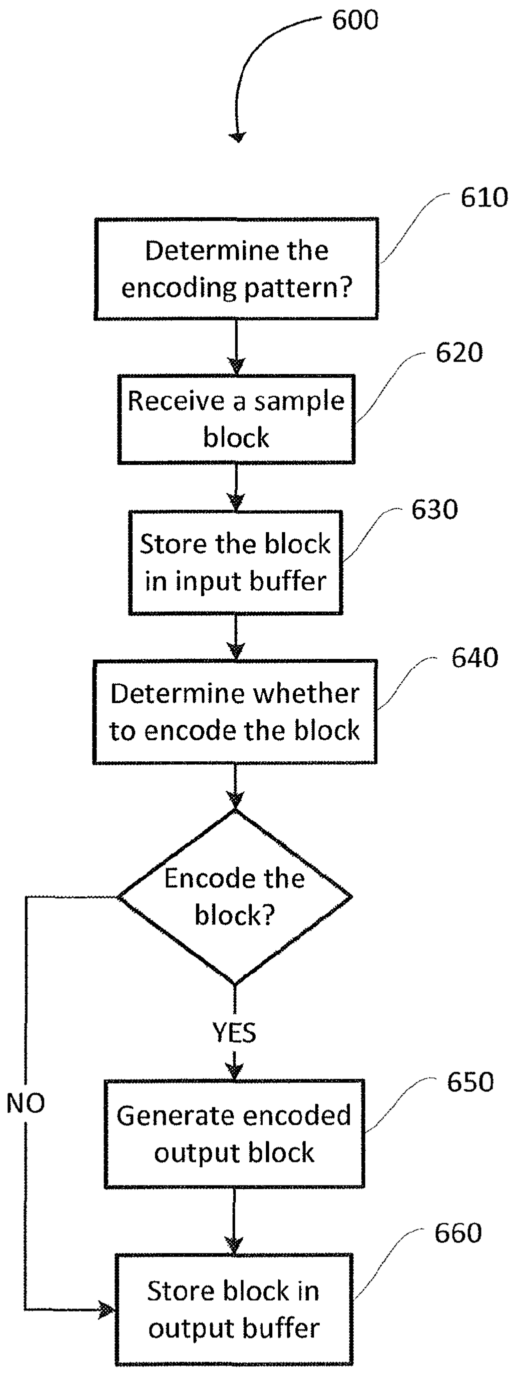

Referring now to FIG. 6, a method 600 for encoding a signal is illustrated. At step 610, an encoding pattern is determined. In some embodiments, not all blocks of a signal are encoded and the signal is encoded according to some pattern of encoded and unencoded blocks in the signal. The encoding pattern can depend on the application. For example, for encoding audio signals an alternating echo modulation pattern described in relation to FIG. 7 can be used or a pattern in which all blocks are modulated can be used similar to the pattern described in relation to FIG. 14. For a power modulation encoding pattern, some embodiments can use a pattern that differs from the echo modulation pattern to lessen any audible effects of the encoding although some embodiments can also use the same or similar power modulation pattern as is used for echo modulation. For example, in some instances an all-block pattern can be used for echo modulation and an alternating pattern can be used for power modulation. In other instances, the same alternating pattern can be used for both echo modulation and power modulation. In yet other instances, different alternating patterns can be used for echo modulation and power modulation. For example, every other block can be echo modulated while every fourth block can be power modulated. The encoding patterns used and whether they differ can depend on the application, the type of information in the encoding, and the type of signal.

At step 620, a sample block of a signal is received. At step 630, the sample block is stored in an input buffer. The input buffer can be a memory device, for example, in content server 120 or some other server. The sample block is stored in an input buffer so that it can be retrieved as input for echo modulation and/or power modulation if required. In some instances, the sample block can be stored in an input buffer where an encoding pattern indicates that information about the sample block will be required for modulating another sample block. At step 640, whether to encode the sample block is determined. Whether to encode the sample block depends on the encoding pattern. If the block is to be encoded, an encoded output block is generated at step 650.

The sample block is encoded according to the encoding patterns. Thus, a block is encoded for each encoding pattern that indicates that the block is to be encoded. For example, a SID and a CID can be introduced into the sample block in the same step. In some instances, more than two codes can be introduced into the sample. In some embodiments, echo modulation is performed first and power modulation is performed second. In instances where more than two codes are introduced, all echo modulation is performed first before any power modulation is performed. Typically, a SID is encoded using echo modulation and a CID is encoded using power modulation. Thus, when the encoded signal is decoded, the SID can be decoded without decoding the CID. This is useful for device 180 which can be subject to distortion or ambient noise rendering power modulation decoding more subject to error. Furthermore, the power modulation used for the CID does not destroy the SID signal or substantially interfere with a device's ability to decode just the SID. In some embodiments, rather than introduce all codes in the same step, the entire encoding process method 600 is performed multiple times to encode a single or multiple codes each time. In such embodiments, the same or different encoding patterns can be used depending on the code.

In some embodiments, to encode the block, each channel of the signal is divided into blocks of size N samples. Samples are n-bit numbers obtained from an analog signal at some sampling rate, for example 44.1 Khz. This is a typical sampling rate for high-quality audio; it is the CD sampling rate. Higher rates are also used for audio including 48 Khz and 96 Khz. Lower rates are possible as well and it should be understood that any sampling rate can be used. Analog signals can be accurately represented by digital samples provided the samples are taken fast enough and they have enough granularity (i.e., enough bits per sample). Those of skill in the art can appreciate the level of granularity required to represent an analog signal with digital samples.

Referring still to FIG. 6, at step 660, the output block is stored in an output buffer. If the block is not to be encoded, it is stored in an output buffer at step 660. Other embodiments may skip step 660 and output the block to a signal distribution system for broadcast or simply write the block to memory for storage. Depending on the encoding patterns, the block can also be stored in an output buffer that serves as input for encoding another block. For example, echo modulation may require the encoded block as input as described further below.

Figure 7:
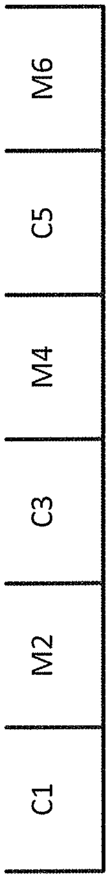
FIGS. 7 and 14 illustrate an encoding pattern of signal blocks in accordance with embodiments.

FIG. 7 illustrates a series of sample blocks of size N. The blocks are labeled either "C" or "M" to indicate that they are either "Clear" or "Modulated" blocks. Clear blocks are not modulated. In other words, C blocks are unencoded and contain the original signal block. Modulated blocks, on the other hand, carry the encoded information. In the embodiment shown, each C block is followed by an M block, and the pattern is strictly alternating. A block size of 1000 samples for a sampling rate of 44.1 Khz, which implies 44.1 blocks sent per second, can be used. But other block sizes are possible.

In the instance where the encoding pattern for both echo modulation and power modulation is alternating as in FIG. 7, an M block is modified in two ways: it contains an echo of the preceding C block and its power is modulated. Let x(n) represent the N samples of block n for the original signal prior to any encoding. In other words x(n) is a vector of size N that represents the original unencoded audio. Let y(n) represent the N samples that will be transmitted for block n. In other words, y(n) is a vector representing the encoded audio samples. Because blocks 1, 3, 5, etc. are clear blocks, y(n)=x(n) for these blocks.

In some embodiments, the echo modulation is performed first. The echo modulation will modify an M block as follows:

$$y(n)=x(n)+\alpha(n)\times x(n-1)$$

For example, for the echo modulation of block 2, the original signal block x(2) is changed as follows:

$$y(2)=x(2)+\alpha(2)\times x(1)$$

for some value of α(2). The magnitude of alpha (α) for each M block controls the power of the echo for that block. In some embodiments, α(n) is chosen adaptively to minimize the perceptible distortion. This can be important for audio signals. For example, for audio that is predominantly spoken word, the audio will include more and larger gaps of silence relative to other types of audio such as music. But, it will also include spikes in the noise level. As discussed in more detail below, the size of α(n) can be adapted, using a shaping function, to the noise level of the content and, in particular, to the noise level of surrounding blocks. Minimization of perceptible distortion is discussed further below. The 1's and 0's of a code can be represented in each modulated block by the sign of the α(n) value for that block. For example, a positive α(n) can represent a 0 and a negative α(n) can represent a 1. In some instances, a positive can represent a 1 and a negative can represent a 0. Thus, in such embodiments, the encoder inserts positive and negative echoes depending on the pattern of 1's and 0's in the codeword. In some embodiments, after echo modulation is performed, power modulation is performed. The power of a block is the average value of the square of each sample in that block. In other words, the power of block n in the original signal is the length squared of the vector x(n), divided by N. We can define norm(x(n)) to be the length squared of vector x(n), so the power of block n is given by:

$$P(n) = \frac{norm(x(n))}{N}$$

For example, with a two-dimensional vector with coordinates (a,b), the length squared of this vector is $a^2+b^2$ so the power is:

$$\frac{a^2 + b^2}{2}$$

This notion of power is consistent with thinking of the x(n) samples as voltage samples, and P(n) as the average power delivered by the block x(n) to a 1Ω (Ohm) load.

In this example, let $\beta \times x(n)$ be the vector obtained by multiplying each sample of x(n) by a constant β. The power of the block $\beta \times x(n)$ is given by $\beta^2 \times P(n)$. Thus, to increase the power of a block by 10%, that is to increase its power by a factor of 1.1, each sample of the block should be multiplied by $\sqrt{1.1}$.

The power of an M block can be modulated by multiplying each sample in the M block. The power is modulated by some beta (β) value. Thus, the actual signal transmitted for an M block when both echo modulation and power modulation are active has the form of an adaptive Finite Impulse Response filter as follows:

$$y(n) = \beta(n) \times (x(n) + \alpha(n) \times x(n-1))$$

Digital codes can be introduced into an analog or digital signal using echo modulation and power modulation. To encode a binary digit (1 or 0) in an M block using power modulation, the power of that block is adjusted to fall into a range which the decoder knows to decode as a 1 or a 0. Referring again to FIG. 7, illustrating C and M blocks, blocks 1 and 3 are C blocks and are not modulated. Both the encoder and the decoder can compute these blocks' powers as P(1) and P(3). The average of these two powers can then be computed as:

$$\frac{(P(1) + P(3))}{2}$$

Figure 8B:
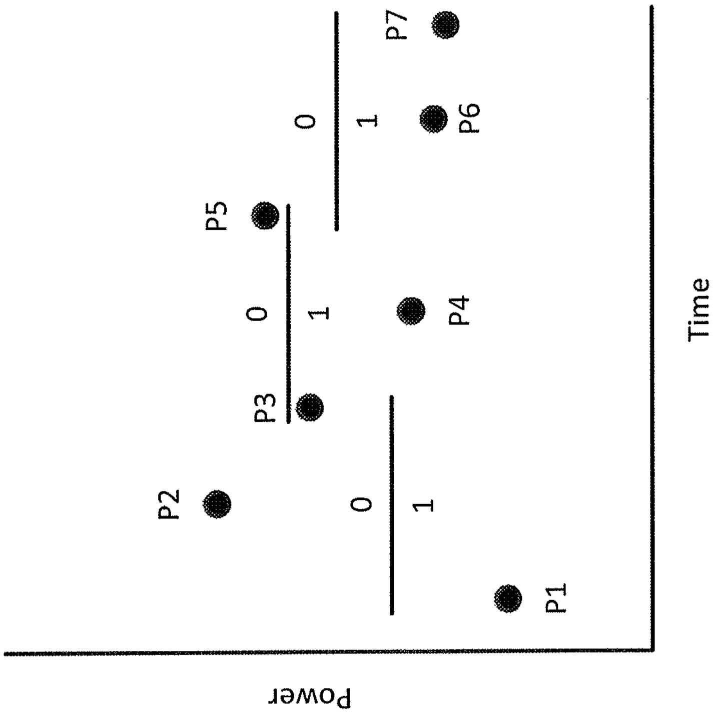
FIGS. 8B and 9B illustrate power modulation ranges for encoding bits in accordance with embodiments.
Figure 8A:
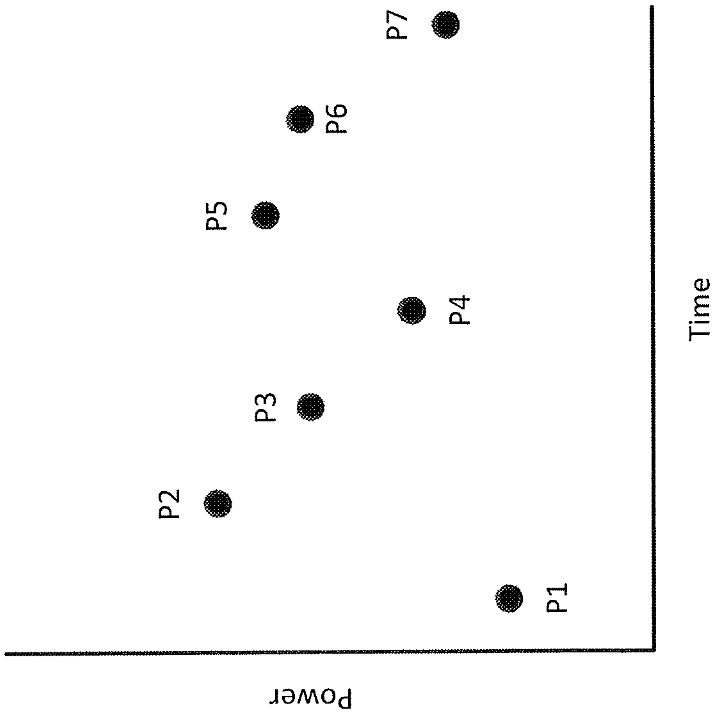
FIGS. 8A and 9A illustrate signals to be encoded in accordance with embodiments.
Figure 9A:
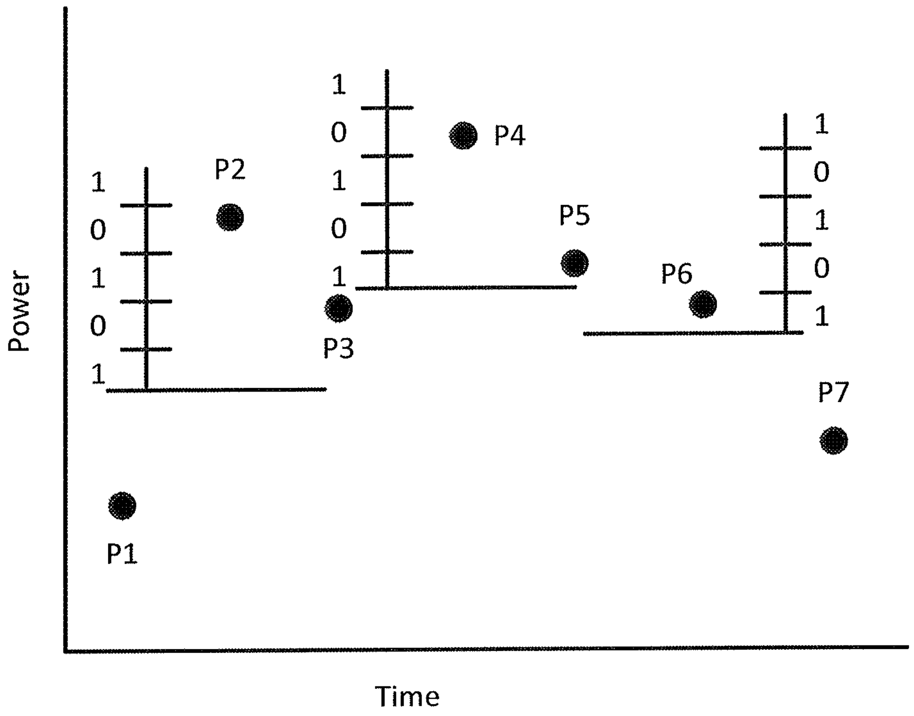

Referring now to FIGS. 8A and 9A, graphs showing signals to be encoded are illustrated. The y-axis indicates the power of the signal blocks while the x-axis represents time and, thus, the sequence of blocks in the signal.

FIG. 8B illustrates a graph showing an exemplary encoding of the signal illustrated in FIG. 8A using power modulation. The graph includes three horizontal lines representing the boundary between a 0 and 1 for the code. In this example, the region above the line represents a 0 and the region below represents a 1. It should be understood that what the region represents can vary in different embodiments and can vary within the same embodiment depending on the application. The rightmost horizontal line represents the average of P(1) and P(3) (i.e., $P_{avg}(1, 3)$). P(2) lies above the line and thus represents a 0 in the code. It can be seen that P(2) was to be encoded with a 0 and, because it already as within the range for 0 (i.e., above the line in this example), it has no need to be modulated. $P_{avg}(3, 5)$ and $P_{avg}(5, 7)$ are also represented by horizontal lines. It can be seen that both P(4) and P(6) fall below their respective lines and thus represent 1's. Accordingly, the encoding is 011 in FIG. 8B. P(4), like P(2), was already below the line and, thus, was not modulated. P(6) on the other hand was modulated to encode a 1. It can be seen that its power was reduced so that it fell below the line. As explained elsewhere herein, the magnitude of the modulation can depend on different factors. In some instances, the modulate P(6) in FIG. 8B can be just below the line or farther below the line than shown in FIG. 8B.

In some instances, the region above the average power can be defined to be a 0 and the region below the average power can be defined to be a 1. In other instances, the region above can be defined as a 1 and the region below can be defined as a 0. The encoder can then nudge the power of block 2 above or below the average power depending on whether a 0 or a 1 is to be encoded for that block. The power is nudged by multiplying every sample in block 2 by a constant β(2). In most instances, approximately 50% of the time the block's power will not need to be adjusted at all because it will already lie in the correct region. In some embodiments, the power is nudged to some target a predefined distance above or below the average power to maintain a guard band. A preferable guard band range lies with 0.1 of the average power (i.e., 0.9 to 1.1 times the average power) of two neighboring or nearby C blocks to protect against distortion. For example, the targeted power could be 1.1 or 0.9 times the average power of the two neighboring C blocks. A preferable guard band range can sometimes depend on the application. For example, higher fidelity audio can demand a smaller range to avoid detectable modulation while lower fidelity audio can tolerate a larger range.

Figure 9B:
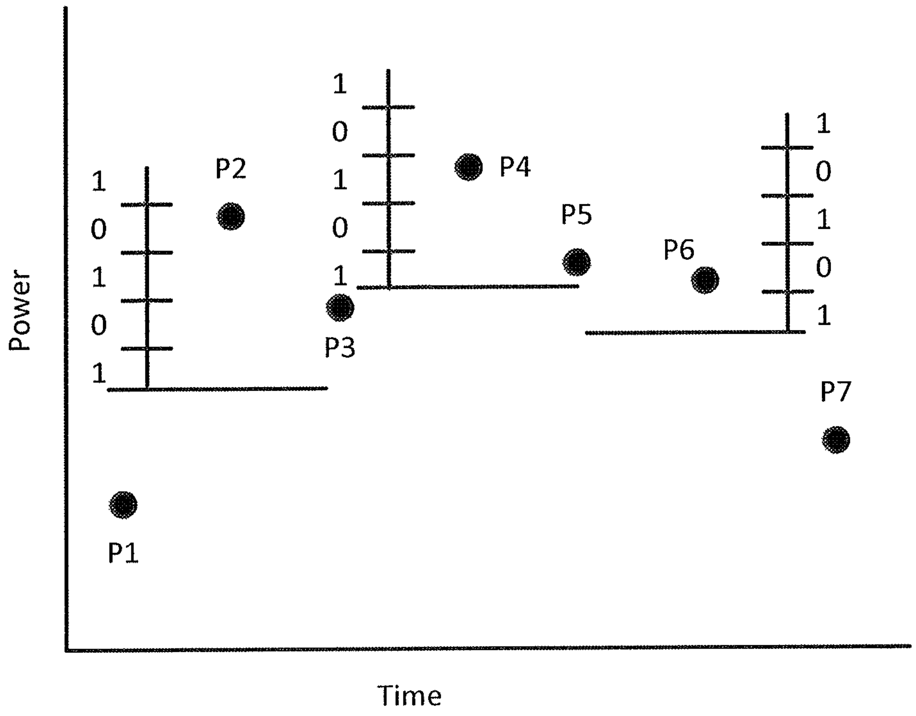

The spacing between P(2), P(4), and P(6) and their respective lines has a large variance relative to the overall variations in P(x). Thus, where greater power modulation will affect signal fidelity (e.g., in sensitive audio signals), it can be more advantageous to represent codes using smaller subranges as illustrated in FIG. 9B. Such an approach has the advantage that the power of any given block does not need to be nudged as far to make it fall into a 1 or a 0 subrange or power region as needed. This minimizes perceptible distortion. An approach in which all of the region above or below the average represents a digit has an advantage of robustness. That is, decoding a signal will be more accurate and the encoding is less susceptible to distortion. The correct tradeoff can depend on the fidelity required for the signal. Note as well that the power regions for a given M block do not need to be defined with reference to the average of the powers of the two neighboring C blocks. It is possible to define multiple regions that will be decoded as a 1 or a 0 as shown in FIG. 9B.

Although FIG. 9A shows a block powers of a signal to be encoded, the subranges are included for illustrative purposes. In FIG. 9B, P(2) falls within a subrange for 0 above $P_{avg}(1,3)$ and remains unmodulated from FIG. 9A because it already fell within a 0 subrange. P(4) and P(6) fall within a 0 and 1 subrange in FIG. 9A, respectively. Thus, to encode the signal with 010, P(4) and P(6) must be modulated. Accordingly, P(4) is modulated to fall within the subrange just above or just below it's current subrange. In this example, P(4) is nudged lower. In some instances, the target subrange can depend whether modulation is to be minimized to maintain fidelity and will be the nearest subrange as in the example shown. In some instances, modulation need not be minimized so that P(4) can be nudged up or down. In some instances, the modulation can depend on a constant and power is nudged up or down such that the constant can be applied. P(6) is nudged up to encode a 0. Again, in this example, the subrange above is nearer and is the target subrange to minimize modulation. In some instances a power may be at the boundary between ranges or subranges or can be too close to a boundary such that decoding errors are more likely. Again, whether a power is too close can depend on a predetermined amount of acceptable or unacceptable distortion or noise that may be introduced. In such cases, even though a power is within a the proper subrange, it may fall within a range of unacceptable error. In such cases, some embodiments can nudge the power so that it falls within a proper range or subrange and outside the range of unacceptable error.

Figure 10:
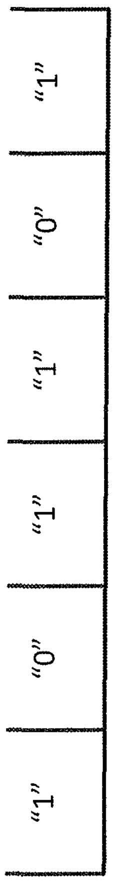
FIG. 10 illustrates subranges of binary digits for use with power modulation encoding in accordance with embodiments.

FIG. 9B illustrates a subrange pattern of 10101 above each line. In some instances, the subrange pattern can vary. Further, in some instances, the subrange pattern below each line can be a mirror image of the pattern above the line or can differ. FIG. 10 illustrates a subrange pattern (laid out horizontally rather than vertically) where the subranges above and below the line are mirror images, with the average power reference point at the middle of the figure. In this diagram four subranges or power regions are defined that will be decoded as a 1 and two are defined that will be decoded as a 0.

The width of each power region can be defined as some fixed fraction of $P_{avg}$, for example 10% of the applicable $P_{avg}$. The decoder must be able to determine where each region lies. By using an a priori width such as 10%, and setting a reference point at $P_{avg}$, this can be accomplished. Any a priori scheme known to both the encoder and the decoder can be employed. For example, a single P value can serve as the reference for defining power regions for all blocks instead of $P_{avg}$. More complicated schemes are possible. For example, in some embodiments, the decoder can determine the larger and smaller of P(1) and P(3) and any power greater than the larger or less than the smaller is decoded as a 1 and any power between them is decoded as a 0. The reference power to use and even the number of power regions to use can depend on the absolute and/or relative powers of P(1) and P(3). For example, if P(1) and P(3) are within a predetermined range (e.g., P(3) differs no more than 10% of P(1)) then P(1) serves as a reference point, otherwise a scheme whereby 0 falls between them and 1 is above or below them can be used. As another example, the size of the subranges can be based on the difference between two Ps, including the absolute value of the difference or some factor of the difference (e.g., 10% of the difference serves as the size of the subranges).

Figure 11:
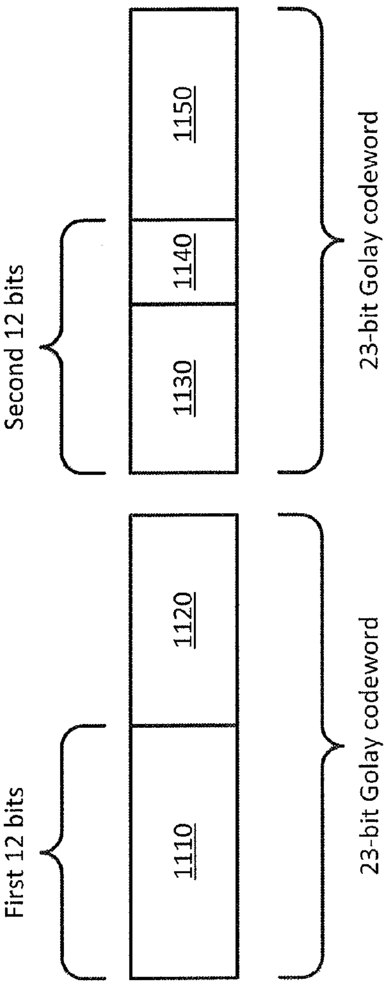
FIGS. 11 and 12 illustrate signal block configurations in accordance with embodiments.

In some embodiments, a SID will represent a radio station as the source of audio content. In some instances, a SID is encoded in an audio signal by assigning each station in a geographical region a unique codeword. The use of gold codes can be useful for SID encoding of radio stations. FIG. 11 illustrates such SIDs in accordance with embodiments. In some embodiments, the gold codes used for the SIDs have equal weights (i.e., same number of 1 bits) and weights of approximately half the gold code length. That is, if the gold code length is 31 bits, the weight can be 15 or 16, plus or minus 1 or 2 and preferably 15 or 16. In the instance where a gold code is 31 bits there could be 15 codes (for 15 sources) each having a weight of 16 (i.e., each code has 16 1's—its weight—and 15 0's). For applications where radio transmissions are encoded, the codes can uniquely identify up to 15 different radio stations.

If more radio stations are to be represented in a given geographic area, the weight and size of the codewords can be larger to accommodate the additional sources. For example, in some instances, a gold code size of 127 can be used to represent up to 64 sources. An added benefit of a gold code size of 127 is that the gold codes then have better correlation properties with respect to each other, which improves echo modulation decoding performance. If fewer radio stations are to be represented in a given geographic area, the weight and size of the codewords can be smaller. Gold code codewords have the property that they have minimal cross-correlations with each other, regardless of their relative shift to each other. This property is used by the decoder to determine which gold code codeword is present. This minimal cross-correlation is discussed further below. In some embodiments, other types of codewords can be used including pseudo-random codewords, and the like.

For SID encoding, the 31-bit SID echo codeword pattern can be repeated throughout the signal. Thus, regardless of when the signal is picked up by a decoder, the SID can be decoded. Note that encoding a 31-bit SID code requires 62 blocks, so where samples are 1000 blocks, it takes about 1.5 seconds to complete one cycle.

In some embodiments, the choice of echo magnitude is done adaptively to minimize perceptibility using a shaping function. Adapting echo magnitude can depend on the profile of the signal, the potential for distortion, and the like. For example, in some instances, the magnitude of $\alpha(n)$ is determined so that the power of the echo signal is a fixed percentage of the power of the block being modulated, for example, 7%. Thus, the echo magnitude is scaled up or down depending on the power of the block being modulated. This scaling has the benefit of minimizing the echo's detectability. As an example, the power of block M2 (prior to any modulation) is P(2); in other words, $$P(n) = \frac{norm(x(2))}{N}.$$

7% of P(2) is 0.07×P(2); $\alpha(2)$ is chosen so that $P(1)\times\alpha(2)^2=0.07\times P(2)$. In other words, $$\alpha(2) = \sqrt{\left(\frac{0.07\times P(2)}{P(1)}\right)}.$$

The percentage selected can depend on the application. For applications subject to higher distortion, a higher percentage is preferable. For applications demanding higher fidelity but not subject to as much distortion, a lower percentage is preferable.

Some embodiments will rely on other factors to adapt the magnitude of $\alpha(n)$. For example, if P(2) (i.e., a modulated block) is greater than both P(1) and P(3) (i.e., unmodulated blocks) then a larger echo power percentage can be used, such as 30%, without the echo becoming objectionable. Similarly, if P(2) is less than both P(1) and P(3), but greater than one-half the average of P(1) and P(3) a larger echo power percentage can again be used. It is preferable to minimize the magnitude of the echo within the context of the signal to minimize audibility in audio signals and yet maximize it to provide robustness against distortion. A psycho-acoustical model can be used as the basis of such rules.

In embodiments in which a SID is encoded using echo modulation and a CID is encoded using power modulation, decoding of the SID is necessary for decoding the CID but the SID can be decoded without decoding the CID. In such embodiments, the SID decoder determines the block boundaries between C and M blocks and provides higher level "framing" information to the CID decoder. In particular, the SID decoder can determine the starting point of a 31-bit SID gold code in the received data. The starting point of a CID is therefore synchronized to the start of a gold code cycle. SID decoding is discussed further below.

Referring again to FIG. 11, an illustration of CID code words in accordance with embodiments is shown. Two Golay codewords are shown that carry the CID. Golay codewords can be used to protect against errors during encoding/transmission/decoding. In the example shown, the CID is 20 bits long and is made up of a first set of 12 bits 1110 in the first codeword and 8 bits 1130 of a second set of 12 bits. The second set of 12 bits also includes a 4-bit CRC 1140. The two 12-bit sections make up a 24-bit CID payload. The CRC 1140 allows errors in the CID to be detected. The Golay codewords also include 11 parity bit sections 1120, 1150. The 11 parity bits depend on the Golay codeword such that any 1, 2 or 3 bit error pattern can be corrected. Note that 2 Golay codewords are needed to encode a single 24-bit CID payload. In some embodiments, the CID mapped onto the Golay codewords is continually repeated encoded throughout a signal. That is, it is encoded in the signal repeatedly. In some embodiments, it is possible to encode only a portion of the signal. For example, content can be encoded at a pre-designated point in the content by a producer of the content. Some embodiments can include a decoder to determine the in the pre-designated point in, for example, the content server so that a different code can be encoded into the signal or so that the code can be repeated throughout the signal.

Figure 12:
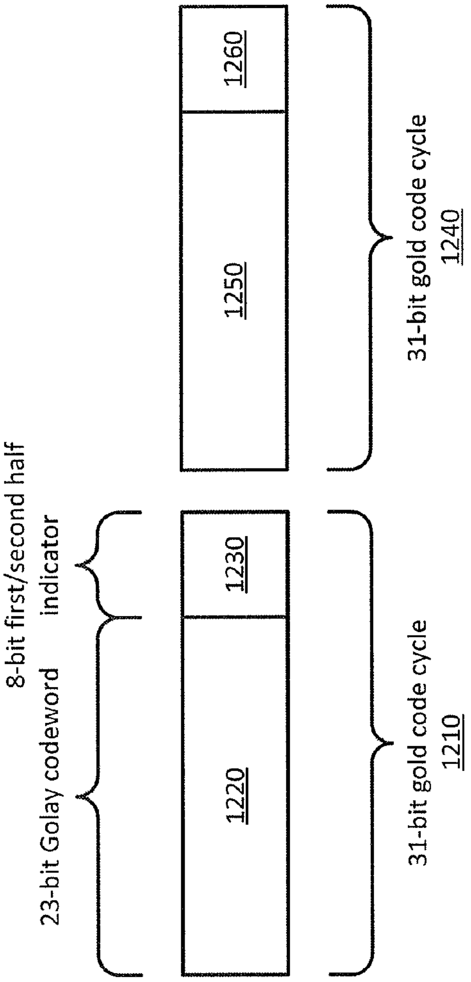

Referring now to FIG. 12, an illustration of SID code words in accordance with embodiments is shown. Two 31-bit gold code cycles 1210, 1240 are shown. Each gold code cycle 1210, 1240 contains a 23-bit Golay codeword 1220, 1250. Because the gold code cycle is 31 bits and the Golay codeword is 23 bits, a Golay codeword should be contained in each gold code cycle with 8 bits left over in each cycle. In some embodiments, the SID decoder will know the start of a gold code cycle or will be able to determine it and, thus, the Golay code decoder can use the known or determined start of a gold code cycle to determine the start of the Golay codeword. In the example shown, the extra 8 bits 1230, 1260 of each gold code cycle 1210, 1240 can be used to indicate whether the it carries the “first half” Golay codeword 1220 or the “second half” Golay codeword 1250. In the example shown, this indication is necessary because two Golay codewords are required to carry the entire 24-bit CID payload, and the Golay decoder would only know from the SID decoder where Golay codeword boundaries occur.

In some instances, if the 8 indicator bits 1230, 1260 are all set to 0 in a particular Golay codeword, it can indicate the codeword carries the first 12 bits of a CID payload and if the 8 indicator bits are all set to 1, the Golay codeword carries the second 12 bits. In other instances, different settings for the 8 indicator bits can be used to indicate the first and second half. For example, in some instances, the decoder can use a “majority vote” of the indicator bits to determine whether the 8 bits were originally 1’s or originally 0’s. In the case where more than three errors occur in a Golay codeword, or too many errors occur in the indicator bits, the decoder can produce an erroneous CID. In this case, the CRC check will almost always fail as well, allowing the CID decoder to know that it must try again to extract the correct 20-bit CID. The 23 Golay codeword bits 1220, 1250 and the 8 indicator bits 1230, 1260 can optionally be interleaved with each other in a pre-determined manner known to both the encoder and the decoder to provide additional protection against burst errors.

In some embodiments, for both echo modulation and power modulation, rather than immediately transitioning on a block boundary to the appropriate value of $\alpha(n)$ and $\beta(n)$, a linear transition is made between 0 for $\alpha$ or 1 for $\beta$ and the desired value over some number of samples. 50 or 75 is a preferable number of samples where N=1000. Such a linear transition avoids sudden discontinuities at block boundaries. A corresponding linear ramp down to 0 for a or 1 for $\beta$ can be performed at the end of each block for the same reason.

Figure 13:
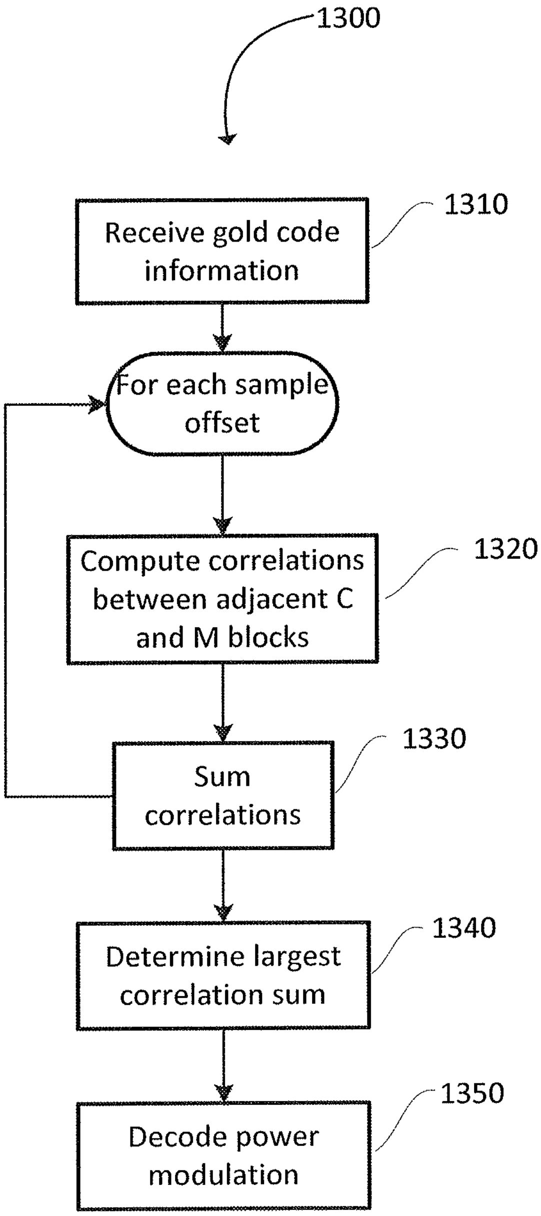
FIG. 13 illustrates a flowchart of a method for decoding a signal in accordance with embodiments.

At a high-level, the SID decoder: a.) computes correlations between adjacent C and M blocks; and b.) sums the resulting correlations in multiple ways to determine which gold code pattern was used by the station. In greater detail, the process works like this. We start with the assumption that the block boundaries between C and M blocks are known:

Referring now to FIG. 13, a flowchart for a method 1300 of decoding a gold code in accordance with embodiments is illustrated that can be performed by, for example, decoder 167 or 185 or other decoder. As discussed above, a gold code can be used to identify a source, or represent a SID. At step 1310 gold code information is received. In some embodiments, the decoder assumes that it does not know in advance where the transmitted signal is in a gold code cycle when it starts decoding. Thus, it will consider a number of possible starting points for each gold code codeword. For example, a system can be designed for 15 radio stations and, therefore, use 15 gold code codewords and gold code codewords that are 31 bits long. Thus, in this example, the decoder can receive information about the length of the gold code codewords and the number of available gold code codewords. Accordingly, all possible 31 starting points are considered for each gold code codeword. Each potential starting point is circular shift in the original gold code codeword such that the decoder will test each of 31 bits for a potential starting point. Accordingly, with 31 potential starting points in each of 15 gold code codewords, the decoder will test for a total of 15×31=465 potential starting points.

At step 1320, correlations between adjacent C and M blocks are computed. In the above example, each of the 465 possibilities corresponds to one gold code and one shift thereof and, therefore, corresponds to a unique sequence of 31 1’s and 0’s. These 465 31-bit sequences of 1’s and 0’s all have small cross correlations with each other. This small cross correlation feature can be critical to making the SID decoder work.

In this example, where block boundaries are known, the SID decoder maintains 465 sums, one for reach possible gold code codeword and shift thereof. Each summer corresponds to its own sequence of 31 1’s and 0’s. As each new M block arrives at the decoder, the correlation value between that block and its preceding C block is computed. This computation is done over N samples, which is the block size. For each of the 465 summers, the computed correlation is added to the previous sum with a sign that corresponds to the next 1 or 0 in that summer’s unique sequence.

For the correct gold code codeword and shift thereof, all the M-block C-block correlation values are summed up “in-phase”, that is, in a reinforcing manner such that negative correlations are subtracted, while positive ones are added. As a result, the output of a summer grows rapidly. The other 464 sums that are being computed will not be in phase with the transmitted signal. Because the codewords are designed to have small cross-correlations, the sums will hover near zero.

Sums can be computed for some predetermined amount of time if possible. Preferably, sums are computed for several seconds (e.g., 8 seconds). The longer the summers run, the lower the probability of an error in the SID decoder. At the end of the predetermined period, the summer with the largest sum indicates both the gold code of the station that was being decoded and the correct shift thereof. If the summers run for a longer time, the larger the disparity will be between the correct summer and the others. However, in some embodiments, it must be assumed that a signal can be short. With the correct shift known, the start of the start of the gold code cycle can be determined. The start of the gold code cycle can also be used by the CID and other decoders for the signal.

For a mathematical description, let r(n)=ρ(y(n), y(n−1)). Assume block n−1 is a C block, and forget about the power modulation for now. The function ρ( ) can be used to indicate the correlation coefficient between the two vectors that are its argument as follows:

$$r(n)=\rho(x(n)+\alpha(n)\times x(n-1),x(n-1))$$

Because of the echo, it can be seen that both arguments of the ρ( ) function have an x(n−1) component. The value r(n) will usually be positive or negative depending on the sign of α(n). For some embodiments, particularly for those used for audio signals, it is not always positive or negative because of changes in the correlation between the audio blocks x(n) and x(n−1) which can be beyond control. Those blocks are part of the underlying audio. The larger α(n) the more likely the correlation will be positive or negative depending on α(n)'s sign.

At step 1330, the correlation is summed. For example, each of the 465 summers can compute the value r(2)±r(4)±r(6)± . . . . Where the choice of +/− at each step for each summer depends on the value of the bits in that summer's unique 31-bit sequence. Only one of the 465 summers has a 31-bit sequence whose 1's and 0's correspond to the true signs of the α(n) values transmitted. This one summer's value will therefore outgrow the values of the others. The summer having the largest sum therefore indicates which gold code codeword, and which shift thereof, corresponds to the echoes added in the received signal. Since each gold code codeword is assigned to a different station, knowing the gold code codeword is equivalent to knowing the SID.

In some embodiments, the SID decoder will not know the sample offset at which the SID starts. The SID decoder therefore can maintain 2×N×465 summers. That is, there are 2×N summers for each of the 465 gold code shift possibilities, because there are 2×N transmitted samples per bit, and, in such embodiments, one summer for each possible sample offset is needed. Accordingly, each of steps 1320 and 1330 is repeated for each sample received as follows. A new ρ( ) value is calculated every time a new sample arrives at the decoder. The ρ( ) value is computed over a window of size N with a delay of N. In this case, w((n×1000)+m)=x(n) [m] where x(n) [m] is the $m^{th}$ component of the vector x(n) and w(k) is the stream of raw samples at the sampling rate of the signal (e.g., 44.1 Khz for audio). A ρ( ) value is computed at each sample position k between the vectors of samples [w(k−(2×N)+1), . . . w(k−N)] and [w(k−N+1), . . . w(k)]. As each new sample is received, correlation is computed between the most recent N samples and the N samples that immediately preceded the most recent N samples. A vector of length 2×N such correlation values is constructed, and once 2×N values are ready, these 2×N values are added to their respective 2×N summers. In total, there is one summer for every gold code, every shift thereof, and every sample offset thereof.

At step 1340, the largest correlation sum is determined. The summer with the largest value after a period of averaging therefore will indicate the correct gold code, the correct shift thereof, and the correct sample offset thereof. This information is sufficient for the CID decoder to determine the C and M block boundaries as well as the points at which to start Golay codeword decoding.

At step 1350, a power modulation encoding pattern is received. The encoding pattern can be received by a decoder from a memory storage device before the decoding process where a pattern is known. In some embodiments, an encoding pattern can be specific to a source and can be received from a server after an SID is decoded. In other embodiments, an encoding pattern can be hardcoded into a decoder. It should be understood that power modulation will be decoded as part of the same process only where a single decoder decodes both echo modulation and power modulation. Thus, method 1300 could be performed at listening post decoder 167. At step 1360, power modulation is decoded. Power modulation can be decoded using the same logic and encoding pattern as used in the encoding process.

Figure 14:
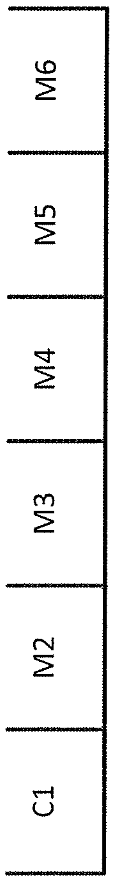

Referring now to FIG. 14, a series of sample blocks is shown exhibiting a different encoding pattern than the pattern found in FIG. 7. Here, only the first block (C1) is not modulated. Some embodiments will generate an encoding pattern as shown in FIG. 14 for echo modulation where each modulated block contains an echo of the previous block. In this pattern, the echo modulation of block n is now given by:

$$y(n)=x(n)+\alpha(n)\times y(n-1)$$

for some value of α(n). As discussed above, the magnitude of α for each block controls the power of the echo for that block. In embodiments that perform echo modulation in accordance with the pattern of FIG. 14, a signal is generated in which an echo propagates forward through multiple blocks instead of being limited to a single adjacent block. However, in such patterns, the echo will decay rapidly because the α(n) values are substantially less than 1. In some instances, the α(n) values are constant and, thus, the decay is exponential.

Furthermore, in such embodiments, because every block now carries an echo, the overall echo signal is stronger. This means that in a given amount of listening time, the probability of correctly decoding the SID or other echo modulation encoding is higher. Such embodiments can be preferable where fidelity concerns are outweighed by robustness.

In embodiments using the echo modulation pattern of FIG. 14, a block size of 500 is preferable for encoding a SID for an audio signal when the audio is sampled at a rate of 44.1 Khz. Other block sizes are possible in other embodiments. Where, the sampling rate is decreased, the block size should be scaled accordingly. Further, in embodiments using the echo modulation pattern of FIG. 14, it is preferable for the CID block size, or the block size of other codes based on power modulation, to be twice the block size of the SID, or the code based on echo modulation. Thus, where the echo modulation block size is 500, the power modulation block size is preferably 1000. Additionally, the power modulation block boundaries preferably align with the echo modulation block boundaries. In some embodiments, the power modulation pattern can still be of the form C-M-C-M as described above. Embodiments that encode signals based on the foregoing parameters (block size ratio, corresponding block boundaries, and different encoding patterns for echo modulation and power modulation) allow the echo and power modulation encodings to operate in a substantially interference free manner with respect to each other. Moreover, such embodiments enable independent echo modulation and power modulation encoding and decoding. Echo modulation can carry block boundary information, which can be acquired decoding echo modulation and then be used to either encode or decode power modulation in the same signal.

Still referring to FIG. 14, with respect to higher level data framing, the start of a gold code can still be used to mark the start of a Golay codeword and the corresponding first/second half indicator bits. For example, 46 blocks of size 1000 are required to carry 23 Golay codeword bits, and 16 blocks of size 1000 are required to carry the 8 first/second half indicator bits. In other words, a total of 62 blocks of size 1000 are required to carry the Golay and indicator bits. Thus, for this example, a gold code of at least a size of 2×62=124 is required for the SID encoding, or echo modulation. It should be understood that in this example, the echo modulation operates on blocks of size 500 instead of 1000 and every block after the first is echo modulated. In embodiments performing echo modulation in accordance with the pattern of FIG. 14, the Golay codeword bits and first/second half indicator bits can be readily mapped onto the blocks of a single gold code cycle in the same way as described above.

Some embodiments described herein relate to a computer storage product with a non-transitory computer-readable medium (also referred to as a non-transitory processor-readable medium) having instructions or computer code thereon for performing various computer-implemented operations. The computer-readable medium (or processor-readable medium) is non-transitory in the sense that it does not include transitory propagating signals (e.g., a propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages and/or other development tools.

In conclusion, disclosed embodiments provide, among other things, a system and method for providing integrated playlists and seamless consumption of media. Those skilled in the art can readily recognize that numerous variations and substitutions may be made to the disclosed embodiments, their use and their configuration to achieve substantially the same results as achieved by the embodiments described herein. Accordingly, there is no intention to limit the disclosed embodiments or the claimed inventions to the disclosed exemplary forms. Many variations, modifications and alternative constructions fall within the scope and spirit of the inventions as expressed in the claims.

What is claimed is:

1. A method, comprising:

receiving a first digital code and a second digital code;

receiving a first block and a second block of a signal;

embedding an echo of the first block of the signal in the second block of the signal to create a first modified second block of the signal in accordance with the first digital code, a magnitude of the echo being a magnitude of the first block of the signal multiplied by a first modifier value, a sign of the first modifier value being based on a binary digit of a corresponding bit of the first digital code;

modulating a power of the first modified second block of the signal to create a second modified second block of the signal in accordance with the second digital code, a magnitude of the second modified second block of the signal being a magnitude of the first modified second block of the signal multiplied by a second modifier value to force the power to fall within a range, the range representing a factor of an average power of a series of blocks of the signal, the series of blocks including at least the first block of the signal; and sending a modified signal including the second modified second block of the signal.

2. The method of claim 1, wherein a sign of a second modifier value is based on a binary digit corresponding to a bit of the second digital code.

3. The method of claim 1, further comprising:

determining whether the power of the first modified second block of the signal falls within a predetermined range;

wherein the power of the first modified second block of the signal is modulated when the power of the first modified second block of the signal does not fall within the predetermined range.

4. The method of claim 3, wherein determining whether the power of the first modified second block of the signal falls within a predetermined range includes:

determining an average power of a series of blocks of the signal, the series of blocks including at least the first block of the signal; and comparing the power of the first modified second block of the signal to the average power of the series of blocks.

5. The method of claim 3, wherein determining whether the power of the first modified second block of the signal falls within a predetermined range includes:

determining a power of each block in a series of blocks of the signal, the series of blocks including at least the first block of the signal; and comparing the power of the first modified second block of the signal to a function of the powers of the individual blocks in the series.

6. The method of claim 1, wherein the range consists of a series of regularly repeating subranges, each subrange representing the same binary digit corresponding to a bit of the second digital code.

7. The method of claim 1, further comprising:

generating the echo of the first block of the signal by applying a shaping function to the first block of the signal.

8. A non-transitory computer-readable storage medium containing a plurality of program instructions executable by a processor, comprising:

an instruction segment for embedding in a second block of a received signal having a first block and second block an echo of the first block of the signal to create a first modified second block of the signal in accordance with a received first digital code, a magnitude of the echo being a magnitude of the first block of the signal multiplied by a first modifier value, a sign of the first modifier value being based on a binary digit of a corresponding bit of the first digital code;

an instruction segment for modulating the power of the first modified second block of the signal to create a second modified second block of the signal in accordance with a received second digital code;

an instruction segment for determining whether an amplitude of the first modified second block of the signal falls within a predetermined range, the instruction segment including:

instructions for determining an average power of a series of blocks of the signal, the series of blocks including at least the first block of the signal, and instructions for comparing the amplitude of the first modified second block of the signal to the average power of the series of block; and an instruction segment for sending a modified signal including the second modified second block of the signal.

9. The non-transitory computer-readable storage medium of claim 8, wherein a magnitude of the second modified second block of the signal is a magnitude of the first modified second block of the signal multiplied by a second modifier value to fall within a predetermined range.

10. The non-transitory computer-readable storage medium of claim 9, wherein a sign of a second modifier value is based on a binary digit corresponding to a bit of the second digital code.

11. The non-transitory computer-readable storage medium of claim 8, wherein the power of the first modified second block of the signal is modulated when the amplitude of the first modified second block of the signal does not fall within the predetermined range.

12. A non-transitory computer-readable storage medium containing a plurality of program instructions executable by a processor, comprising:

an instruction segment for embedding in a second block of a received signal having a first block and second block an echo of the first block of the signal to create a first modified second block of the signal in accordance with a received first digital code, a magnitude of the echo being a magnitude of the first block of the signal multiplied by a first modifier value, a sign of the first modifier value being based on a binary digit of a corresponding bit of the first digital code;

an instruction segment for determining whether the power of the first modified second block of the signal falls within a predetermined range, said instruction segment including:

an instruction segment for determining the power of each block in a series of blocks of the signal, the series of blocks including at least the first block of the signal; and an instruction segment for comparing the power of the first modified second block of the signal to a function of the powers of the individual blocks in the series;

an instruction segment for modulating the power of the first modified second block of the signal to create a second modified second block of the signal in accordance with a received second digital code, the power of the first modified second block of the signal modulated when the power of the first modified second block of the signal does not fall within the predetermined range.

13. The non-transitory computer-readable storage medium of claim 8, wherein a magnitude of the second modified second block of the signal is a magnitude of the first modified second block of the signal multiplied by a second modifier value to fall within a range, the range representing a factor of an average power of a series of blocks of the signal, the series of blocks including at least the first block of the signal.

14. The non-transitory computer-readable storage medium of claim 12, wherein the range consists of a series of regularly repeating subranges, each subrange representing the same binary digit corresponding to a bit of the second digital code.

15. The non-transitory computer-readable storage medium of claim 8, further comprising:

an instruction segment for generating the echo of the first block of the signal by applying a shaping function to the first block of the signal.

16. A method, comprising:

receiving a first digital code and a second digital code;

receiving a first block and a second block of a signal;

embedding an echo of the first block of the signal in the second block of the signal to create a first modified second block of the signal in accordance with the first digital code;

determining whether a power of the first modified second block of the signal falls within a predetermined range, said determining including: (a) determining an average power of a series of blocks of the signal, the series of blocks including at least the first block of the signal, and (b) comparing the power of the first modified second block of the signal to the average power of the series of blocks;

when the power of the first modified second block of the signal does not fall within the predetermined range, modulating the power of the first modified second block of the signal to create a second modified second block of the signal in accordance with the second digital code; and sending a modified signal including the second modified second block of the signal.

17. The method of claim 16, wherein determining whether the power of the first modified second block of the signal falls within a predetermined range includes:

determining a power of each block in a series of blocks of the signal, the series of blocks including at least the first block of the signal; and comparing the power of the first modified second block of the signal to a function of the powers of the individual blocks in the series.

* * * * *